3,313,753
FLOOR TILE COMPRISING VINYL CHLORIDE-
VINYL ACETATE COPOLYMER AND MODI-
FIED POLYOXYMETHYLENE
William J. Roberts, Charlotte, N.C., and Edward J.
Hensch, Park Ridge, N.J., assignors to Celanese Cor-
poration, a corporation of Delaware
No Drawing. Filed Sept. 16, 1965, Ser. No. 487,925
4 Claims. (Cl. 260—23)

This application is a continuation-in-part of copending application Ser. No. 188,856, filed Apr. 19, 1962, now abandoned.

This invention relates to polymeric compositions containing oxymethylene polymers. More particularly, it relates to the incorporation of oxymethylene polymers into compositions having present as a major thermoplastic component thereof polymers of unsaturated ethylenic compounds, preferably terminally unsaturated.

The addition of oxymethylene polymers to the vinyl polymers and vinylidene polymers has been found to provide a homogeneous material having improved hardness, gloss and strength as compared to the vinyl composition per se.

Suitable oxymethylene polymers include both homopolymers and copolymers of sufficiently high molecular weight and sufficiently good thermal stability to be moldable. Homopolymers are conveniently prepared by the polymerization of formaldehyde or by the polymerization of trioxane, a cyclic trimer of formaldehyde. Copolymers having successively recurring oxymethylene units and interspersed higher alkyl oxyalkylene units are described in U.S. Patent 3,027,352, issued Mar. 27, 1962 to Walling, Brown and Bartz, and incorporated herein by reference.

The aforementioned oxymethylene polymers may be admixed with thermoplastic vinyl and vinylidene polymers such as, for example, polyvinyl chloride, polyvinylidene chloride, coumarone-indene resins, rubber (both natural and synthetic), styrene-butadiene copolymers, acrylates and methacrylates.

For homogeneous blending with the oxymethylene polymers, the thermoplastic vinyl or vinylidene polymer should be one which has a softening point not appreciably higher (no more than about 30° C. above) the softening point of the oxymethylene polymer.

Molecular weights of the moldable (at, e.g. 160° C. and 3000 p.s.i.) oxymethylene polymers are generally in excess of 20,000 ($M_n$) and preferably in the range of 30,000 to 80,000 or more, corresponding generally to inherent viscosities (determined as a solution of 0.1 gm. of polymer in 100 ml. of a mixture of 98 weight percent of p-chlorophenol and 2 weight percent of α-pinene) of above 0.9, preferably between about 1.2 and about 2.4. Melt indices, taken in accordance with Condition E of ASTM-D-1238, may be in the range of 0.2 to 50 dg./min. and preferably do not exceed 30 dg./min. 10X (Condition F) values range between about 10 and 900 dg./min., with 10X/X ratios of 15 to 150, preferably 16 to 20.

The preferred compositions comprise copolymers and terpolymers having at least one chain containing at least 85 mol percent of recurring oxymethylene units interspersed with up to about 15 mol percent of —OR— units, wherein R is a divalent radical containing at least 2 carbon atoms directly linked to each other and positioned in the chain between the two valences, with any substituent in the R radical being inert, the terpolymers having at least 0.1 up to 7 mol percent of said —OR— units having carbon atoms linked to other chains. Such copolymers and terpolymers are found described in the aforementioned Walling et al. patent and French Patent 1,345,218.

Suitable oxymethylene copolymers which may be used contain carbon-to-carbon, single-bond linkages interspersed among the oxymethylene groups in the chain. Such copolymers include copolymers of trioxane with cyclic acetals, lactones, cyclic carbonates, cyclic acid anhydrides and ethylenically unsaturated monomers, as disclosed in an article by Kern et al. in "Angewandte Chemie" 73(6), pages 177 to 186 (Mar. 21, 1961).

Oxymethylene homopolymer chains having ester or ether end groups are also suitable for use in this invention. Such polymers are also disclosed in the above cited Kern et al article.

The preferred oxymethylene polymers are those containing about 1 to about 5 weight percent of interspersed oxyethylene units in the oxymethylene chain. The polymer is preferably stabilized by degradation of its molecule ends to a point where a stable carbon-to-carbon linkage exists at each end. Thermal degradation, as disclosed in U.S. Patent 3,103,499 of Dolce and Berardinelli, or degradation by hydrolysis may be used, as disclosed in application Ser. No. 23,658, filed Apr. 21, 1960 by Berardinelli, now abandoned, continuation-in-part application Ser. No. 102,097, filed Apr. 11, 1961, and now abandoned, and continuation-in-part application Ser. No. 372,390, filed June 3, 1964, now U.S. Patent No. 3,219,623. The chemical stabilizers disclosed in said applications may be used and particularly a mixture of a phenolic antioxidant and a nitrogen-containing scission inhibitor.

The preferred stabilization system comprises at least one amidine compound and an alkylene bisphenol. Most preferably from about 0.01 to about 0.5 weight percent of cyanoguanidine, or a mixture of cyanoguanidine and melamine, is employed in combination with from about 0.40 to about 0.65 weight percent of 2,2'-methylene bis (6-t-butyl-4-methyl phenol).

In the composition the oxymethylene polymers are compatible with the vinyl polymers in that the admixtures after proper blending are uniform in appearance and properties. The properties of the polymer compositions are altered by the addition of the oxymethylene polymer in a manner dependent on the nature of the particular vinyl polymer used but generally in the direction of greater hardness, toughness, tensile strength and gloss.

The admixture of this invention contain from about 25 to about 90 weight percent of the vinyl polymer and from about 10 to about 75 weight percent of the oxymethylene polymer.

Since the vinyl polymer is usually a lower-priced polymer and a principal function of the blending step is the improvement of the vinyl polymer, the blend will usually contain no more than about 50% of the oxymethylene polymer although greater amounts may be used, if desired.

Suitable vinyl and vinylidene polymers include, as stated above, the polyvinylidene halides such as polyvinylidene chloride; the polyvinyl halides such as vinyl chloride polymers including copolymers with unsaturated esters of saturated carboxylic acids such as the alkenyl alkanoates, e.g. vinyl acetate, allyl acetate, etc.; coumarone-indene resins (principally mixtures of homopolymers and copolymers of indene and coumarone, ranging from low viscosity liquids to hard, brittle solids softening at about 215° C. (specific gravities generally ranging from about 1.05 to 1.15) obtained by the acid catalyzed (e.g. sulfuric acid, aluminum chloride, etc.) polymerization of solvent-naphtha fractions (e.g. 165–185° C. fraction) of coal tar) such as "Cumar W" a light-colored, medium-hard, flaky solid with a M.P. of 150–160° C., or "Cumar RH" a dark-colored, rubber-hard solid with a M.P. of 77–85° C.; rubbers (both natural and synthetic) including polyisoprene, polybutadiene, polyisobutylene, ethylene-propylene copolymers, chlorosulfonated polyethylene, chlorinated polybutadiene, styrene-butadiene copolymers, etc.; and acrylates and methacrylates such as polymethyl methacrylate, polyethyl acrylate, polybutyl acrylate, polymethyl acrylate, etc. Preferred such vinylidene polymers are derived from monomers having polar substituents, e.g. vinyl acetate, inorganic substituents, e.g. vinyl chloride, or more than one ethylenic unsaturation, e.g. butadiene. For example, highly preferred embodiments employ vinyl chloride-vinyl acetate copolymers or styrene-butadiene copolymers.

The admixture of the oxymethylene polymer and the vinyl polymer is best achieved by milling a dry mixture of the polymers (with additives as required) on a milling apparatus such as a 2-roll mill, a Banbury mixer or an extruder.

The compositions of this invention are useful in the applications generally suitable for the vinyl polymers including floor and wall covering, phonograph records, piping, sheeting and chemical equipment. They are particularly useful in floor tile compositions.

Floor tile compositions are generally vinyl chloride polymers and particularly vinyl chloride-vinyl acetate copolymers (3 to 13 wt. percent of vinyl acetate), containing 20 to 60 parts by weight of plasticizer per 100 parts of resin. The resins and plasticizer together are referred to as the binder. Floor tiles generally contain 25 to 50 weight percent of binder in homogeneous tiles and as little as 20 weight percent in vinyl asbestos tiles, with the remainder being filler. Stabilizers and lubricants may be present in small amounts. Such compositions are conveniently modified by the incorporation of 3 to 28 weight percent of the oxymethylene polymer together with its stabilizers (based on the total composition).

The plasticizers include those commonly used with vinyl chloride polymers such as phosphate esters, e.g. tri(2-ethyl hexyl) phosphate, tricresyl phosphate, tris (chloroethyl) phosphate, etc.; phthalate esters, e.g. dibutyl phthalate, dihexyl phthalate, butyl octyl phthalate, etc.; chlorinated paraffins, e.g. "Chlorowax 50" a chlorinated paraffin of the formula $C_{20}H_{34}Cl_8$, having a molecular weight of about 556 and a specific gravity of 1.18; epoxidized unsaturated oils, such as epoxidized soybean oil, e.g. "Paraplex G62," having an epoxide equivalent weight of 257, and a molecular weight of 1000; dibasic acid esters such as dibutyl adipate, dicapryl adipate, di-2-ethyl hexyl azelate; and saturated terminated (low-free OH or COOH polyesters) such as propylene glycol adipate terminated with a fatty acid, e.g. lauric acid, pelargonic acid, etc.

Pigments and fillers include titanium dioxide, carbon black, chrome green, calcium carbonate, limestone, calcium silicate, silica flour, chopped asbestos fiber and other mineral fibers, whiting and clay.

*Example I*

Floor tiles were prepared by admixing 10 and 50 parts, respectively, of an oxymethylene-oxyethylene copolymer, with 308.5 and 258.5 parts, respectively, of vinyl chloride-vinyl acetate copolymer ("Vinylite VYNW" having an average molecular weight of 24,000 and containing 13 weight percent of vinyl acetate) floor tile formulations (containing 100 and 50 parts, respectively, of the copolymer), milling the mixture at 160° C. for 7 minutes until homogeneous in appearance, and pressing placques from the milled sheet (9" x 9" x ⅛') at 160° C. and 3000 p.s.i. Placques pressed from the formulation containing the oxymethylene copolymer (about 3 and 16 weight percent, respectively, based upon total composition at vinyl/oxymethylene polymer ratios of 10:1 and 1:1) were exceptionally glossy in appearance, as compared to control tiles consisting solely of the vinyl floor tile formulations.

The oxymethylene polymer was a trioxane-4-5 weight percent dioxolane copolymer having recurring oxymethylene units interspersed with recurring oxyethylene units derived from the dioxolane (typically prepared by admixing trioxane and about 4.0 weight percent of distilled dioxolane in a suitable reaction vessel, e.g. a "Readco" mixer, heating to about 60° C., adding a catalytic amount, e.g. 0.02 weight percent of boron fluoride dibutyl etherate, reacting for about 1½ hours, quenching with acetone and tributylamine and recovering high molecular weight polymer, e.g. inherent viscosity as a solution of 0.1 gm. of polymer in 100 ml. of a 98/2 mixture of p-chlorophenol/α-pinene at 60° C. of about 1.8). The copolymer was stabilized by milling for 30–45 minutes at 180° C. and by the incorporation of 0.5 weight percent of 2,2'-methylene bis(4-methyl-6-tertiary butyl phenol) and 0.1 weight percent of cyanoguanidine.

The vinyl floor tile composition contained in addition to the 100 and 50 parts of the vinyl chloride-vinyl acetate copolymer, conventional additives, e.g. plasticizing or binding agents, stabilizers and fillers, as follows: 5 parts of "Paraplex G-62," an epoxidized soybean oil, having an epoxide equivalent weight of about 257, and a molecular weight of about 1000; 30 parts of "Silene EF," a mineral pigment consisting of a soft, highly absorptive, white, finely divided precipitate of hydrated calcium silicate (CaO—19%; $SiO_2$—67%); 160 parts (about 50% of total composition) of "Atomite," a mechanically ground calcium carbonate substantially free from particles larger than 15 microns; 10 parts of "Titanox RA–50," a high-hiding rutile titanium dioxide modified only for fast wetting and reduction of after-yellowing; 0.5 part of "Ferro 703":zinc base fatty acid salts with organic inhibitors, a pale yellow liquid of sp. g. 0.92; and "Ferro 1825":barium and cadmium base fatty acid salts with organic inhibitors, a cream white powder with spec. gr. of 1.21.

It is to be understood that the foregoing detailed description is given merely by way of illustration and that many variations may be made therein without departing from the spirit of our invention.

The embodiments of the invention in which an exclusive property or privilege is claimed are defined as follows:

1. A polymeric composition exhibiting exceptional gloss and improved hardness which comprises:
    (a) from about 25 to 50 weight percent of a vinyl chloride-vinyl acetate copolymer containing from about 3 to about 13 weight percent of combined vinyl acetate;
    (b) from about 3 to about 28 weight percent of a copolyacetal having primary chains consisting essentially of recurring oxymethylene units interspersed with —OR— units wherein R is a divalent radical containing at least two carbon atoms directly linked to each other and positioned in the chain between the two valences with any substituent in the R radical being inert, said copolyacetal having a number average molecular weight of between about 30,000 and about 80,000; and (c) an inorganic filler selected from the group consisting of titanium dioxide, carbon black, chrome green, calcium carbonate, limestone, calcium silicate, silica flour, whiting and clay.

2. The polymeric composition of claim 1 wherein the copolyacetal has a number average molecular weight of at least 20,000.

3. The polymeric composition of claim 1 in which a plasticizer is mixed with the vinyl chloride-vinyl acetate copolymer in the amount of from about 20 to 60 parts per 100 parts of the copolymer.

4. The polymeric composition of claim 3 in which the plasticizer is an epoxidized soybean oil.

References Cited by the Examiner
UNITED STATES PATENTS

| | | | |
|---|---|---|---|
| 2,516,591 | 7/1950 | Remington | 260—41 |
| 2,773,851 | 12/1956 | Tolman | 260—31.8 |
| 2,899,398 | 8/1959 | Pflaumer | 260—23 |
| 2,985,623 | 5/1961 | Schweitzer et al. | 260—67 |
| 3,015,640 | 1/1962 | Weaver et al. | 260—31.8 |
| 3,027,352 | 3/1962 | Walling et al. | 260—67 |
| 3,169,938 | 2/1965 | Evers et al. | 260—67 |

LEON J. BERCOVITZ, *Primary Examiner.*

DONALD E. CZAJA, *Examiner.*

R. A. WHITE, *Assistant Examiner.*